July 24, 1956  J. T. CLARKE  2,756,202
CATION EXCHANGE MEMBRANES COMPRISING CONDENSATION
POLYMERS OF SULFONATED ALKYL ARYL ETHERS
Filed Jan. 25, 1952
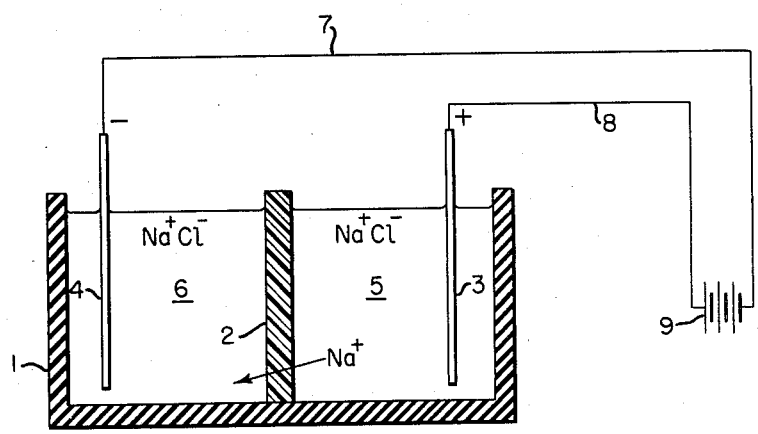
INVENTOR.
JOHN THACHER CLARKE
BY
ATTORNEYS

United States Patent Office 2,756,202
Patented July 24, 1956

2,756,202

CATION EXCHANGE MEMBRANES COMPRISING CONDENSATION POLYMERS OF SULFONATED ALKYL ARYL ETHERS

John Thacher Clarke, Newton Highlands, Mass., assignor to Ionics, Incorporated, Cambridge, Mass., a corporation of Massachusetts Application January 25, 1952, Serial No. 268,241

12 Claims. (Cl. 204—151)

This invention relates to electrically conductive, solid materials having ionic selectivity and substantial cation exchange capacity and which are stable in alkaline solutions and in particular to hydrous, synthetic, organic, electrolytic polymers which are condensation products of sulfonated alkyl aryl ethers with aldehydes and to methods of preparing them.

Until recently, solid materials, particularly synthetic organic resins, having substantial ion exchange capacity were obtainable only in particulate form, such as granules or beads. The copending application of Walter Juda and Wayne A. McRae, Serial No. 103,784, filed July 9, 1949, now Pat. Ser. No. 2,636,851; issued April 28, 1953, describes synthetic polymeric materials in the form of hydrous gels which may be formed into such large-dimensioned solid, unfractured structures as membranes, tubes, rods, vessels, and the like. These materials, like ion exchange resins, include in their polymeric structure dissociable ionizable radicals, one ionic component of which is fixed into or retained by the polymeric matrix and at least one component of which consists of a mobile and replaceable ion electrostatically associated with the fixed component. The ability of the mobile ion to be replaced, under appropriate concentration conditions, by ions of the same design, imparts ion exchange characteristics to these materials.

More important, however, is the effect the fixed radicals have on the electrochemical properties of these materials. The fixed ions possess electrostatic charges which attract mobile ions of opposite sign and repel ions of the same sign. Under the influence of an electric field, ions charged like the mobile ions may be caused to permeate the material exclusively of ions of the opposite charge, which are repelled. These materials are accordingly electrically conductive and selectively permeable.

The present invention comprises polymeric solid materials of the general characteristics of those described by Juda and McRae, and provides coherent homogeneous solids which are highly conductive and selectively permeable to cations and which also have substantial cation exchange capacity. It is further a feature of the materials of this invention that they are mechanically durable, so that they may be formed into self-sustaining structures, and are substantially hydraulically impermeable under ordinary pressure differentials, so that they may be used effectively as hydraulic separators. These materials may be used in dialysis and electrodialysis apparatus where advantage may be taken of their selectively permeable and highly conductive properties. Several such arrangements are described in the above identified application of Juda and McRae.

Membranes and other large dimensioned structures of condensation products of aldehydes and sulfonated phenol or phenol sulfonic acid may be produced in accordance with the above mentioned application of Juda and McRae. Such structures are unstable in strongly alkaline solutions in that they swell and decreptitate on long-standing. These structures are therefor practically limited to essentially neutral or acid solutions in their application. It is an object of this invention to produce large dimensioned, electrically conductive, cation permeable structures which are stable in alkaline solutions.

According to the process of this invention, methylol-forming sulfonated alkyl aryl ether and an aldehyde are caused to condense under acid conditions while maintained in dispersion in a solvent under conditions which prevent substantial evaporation of the solvent. Condensation is effected by any of the well-known expedients as, for instance, by heat, pressure, or catalytic accelerators, and is continued until a water insoluble, infusible, solvated gel is formed.

By maintaining dispersion conditions throughout the condensation, there results a solid gel containing a continuous solvent phase which retains the form of the dispersed mass and which is furthermore a coherent, homogeneous structure stable in alkaline solutions. The volume of the solvent present during the polymerization has been found to determine or fix the equilibrium liquid content of the polymerized gel structure. That is, the gel, when one liquid is replaced by another, imbibes about the same volume of liquid as was present during polymerization. The gel does, however, shrink when solvent is removed from it, as by evaporating (regaining nearly the volume on resolution, however) which indicates that the polymeric matrix of the gel is not rigid but is of limited extensibility.

It has been found that in order to attain these desirable electrochemical characteristics, the solvent should be present in the dispersion in an amount of at least 20 per cent by weight based on the weight of condensed solid material including solvent and should not be reduced at any time, either during the condensation or afterwards, unless replaced by another solvent. Permitting the solvent content to become lower is likely to cause cracking and impairment of the electrical properties of the material. Although a minimum solvent content of 20 per cent has been found effective for the purposes of this invention, preferred embodiments include much larger amounts, between 35 and 70 per cent, and may include such larger amounts as do not interfere with the physical structure of the solids. Structures including as much as 80 per cent solvent have been found entirely satisfactory.

While water is the preferred solvent of polymerization for carrying out the method of manufacture of this invention, organic solvents such as methanol or other alcohols and dioxane or other ethers may be used effectively as long as substantially non-evaporative conditions are maintained throughout the polymerization.

The ordinary curing conditions, previously used, in which water or other solvent is allowed to escape or evaporate, do not result in the formation of continuous, coherent, and homogeneous structures which are selectively permeable and electrically-conductive. Either a continuous, resinous, dielectric structure results, as is typified by the well-known phenolic molding resins or a fractured or particulate structure results which is typified by the granular ion exchange resins.

The products produced in accordance with this invention have been found to have high electrical conductivities generally in excess of $5 \times 10^{-3}$ ohm$^{-1}$ cm.$^{-1}$. They are substantially selectively permeable to cations as indicated by the fact that in the standard concentration cell:

| calomel electrode | sat'd KCl bridge | 0.1 N KCl | membrane | 0.01 N KCl | sat'd KCl bridge | calomel electrode |
|---|---|---|---|---|---|---| at 25° C., a characteristic concentration potential approaching the thermodynamic ideal of 55.1 millivolts may be measured. The ion exchange capacity of these materials is in excess of 0.3 milliequivalents per gram of 105° C. dried solid material. They possess hydraulic resistivities in excess of $10^2$ atm. sec. cm.$^{-2}$. (The pressure in atmospheres required to cause liquid to permeate a centimeter cube of the material at the rate of one cubic centimeter per second.)

Structures may be formed in accordance with this invention by casting or molding (including pressure molding) an aqueous acid dispersion of polymerizable ingredients and causing polymerization in the mold while preventing the evaporation or escape of substantial amounts of water, for instance, by closing the mold or by otherwise carrying out the polymerization under substantially saturated aqueous conditions. In this way, forms and structures may be obtained in any desired shape or size, including structures having at least one and more particularly at least two dimensions greater than ¼ inch, and which are accordingly far greater in size than structures in which conventional ion exchange materials have been made in the past. Such cast or molded structures may, if desired, be further formed as by machining or grinding.

Alkyl aryl ethers or alkyl substituted-aryl ethers which may be used include compounds having the general structural formulas:

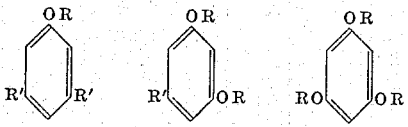

where R represents methyl, ethyl, or other suitable predominantly alkyl group and R' represents hydrogen; an alkyl group such as methyl, ethyl, or propyl; a suitably substituted alkyl group such as carboxymethyl; or a halide such as chlorine or bromine. Similar compounds may be used which are capable of forming water insoluble sulfonic acids which have at least two hydrogen atoms susceptible to methylol formation. The alkyl aryl ethers may be sulfonated by conventional processes using sulfonating agents such as sulfuric acid, chlorosulfonic acid, and sulfur trioxide. Suitable methods are illustrated in the examples. In this connection, it is not necessary for the manufacture of useful products in accordance with this invention that all of the alkyl aryl ether be sulfonated. Although complete monosulfonation of an alkyl aryl ether having three hydrogen atoms susceptible to methylol formation results in the formation of a compound having only two hydrogen atoms susceptible to methylol formation, it has been found that crosslinked polymers may nevertheless be formed. Apparently all the sulfonic acid groups are not retained in the polymeric matrix.

Methylol formation occurs when an aromatic compound having an active hydrogen atom, for example, in the ortho or para position with respect to a methoxyl group and which is not otherwise deactivated, as by the influence of other groups, is caused to react with formaldehyde. As an example, in the reaction between anisole and formaldehyde, the first reaction products are ortho and para methoxy benzyl alcohol which contain the methylol group —CH$_2$OH:

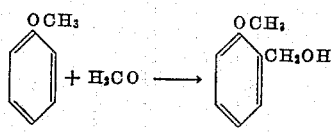

and

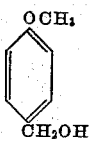

Others include phenetole and other phenyl alkyl ethers; resorcinol dimethyl ether and other resorcinol dialkyl ethers; and the trialkyl ethers of phloroglucinol. The metasubstituted derivatives of the foregoing alkyl aryl ethers may also be used provided the substituent groups do not prevent methylol formation. Phenol may be incorporated in conjunction with the alkyl aryl ethers but at the risk of decreasing the desired resistance to swelling and decrepitation in alkaline solutions. Mixtures of alkyl aryl ethers are often advantageous having improved mechanical and electrochemical properties.

The aldehydes which may be used include all those which can be caused to condense with methylol forming phenols, such as formaldehyde, acetaldehyde, furfural, and the like. Formaldehyde is preferred because of the short crosslinks which it forms on condensation. It may be used in its gaseous form, but it is far more convenient to use its aqueous solution, or materials which are readily decomposible to formaldehyde such as paraformaldehyde, metaformaldehyde, hexamethylenetetramine and the like.

The rate of condensation of sulfonated alkyl aryl ethers with aldehydes may be decreased and controlled by partially neutralizing the sulfonated products with sodium hydroxide or ammonia. Aqueous solutions of sulfonated alkyl aryl ethers and aldehydes which polymerize too rapidly to be easily cast except at inconveniently low temperatures may be controlled by this partial neutralization. However, for best results, the pH of the polymerizing solution should be less than 2. Products prepared from partially neutralized sulfonated alkyl aryl ethers are equivalent to those prepared from sulfonation products which are not partially neutralized.

The proportions in which the ingredients should be combined are most accurately described in molar quantities. Preferably, there are employed from 0.8 to 1.2 mols of sulfonating agent per total number of mols of alkyl aryl ethers and more than 1.3 but less than 2.0 mols of aldehyde per total number of mols of alkyl aryl ethers. (If phenol is used in conjunction with alkyl aromatic ethers, the ratio of sulfonating agent and aldehyde is calculated on the basis of the total number of mols of phenol and alkyl aryl ethers.) Combinations outside these proportions may be used to produce large structures according to this invention but with some sacrifice of the desirable characteristics. For instance, the ratio of sulfonating agent to alkyl aryl ethers may be expanded to 1.5. However, low conductivity results when lesser sulfonating agent than recommended is used. Furthermore, it has been found that increasing the ratio of sulfonating agent does not generally result in a corresponding increase in active groups in the polymerized product. For example, for products based on anisole, only about 0.3 mol of sulfonating agent are retained in the polymerized structure per mol of anisole in the range of 1.0 to 1.5 mols of sulfonating agent per mole of anisole. In other words, increasing the sulfonating agent from 1.0 to 1.5 mols per mol of anisole results in no substantial increase in the amount of sulfuric acid retained in the polymer. The ingredients should be combined by mixing the sulfonating agent and alkyl aryl ethers, and thus forming at least in part, an alkyl aryl ether sulfonic acid. The sulfonated alkyl aryl ethers should then be combined with the aldehydes below room temperature to form an aqueous solution either by adding them to water or by mixing an aqueous solution of one with the other. While the mixture is still fluid, it is appropriately shaped as by molding, and cured under non-evaporating conditions by the application of heat.

The following examples describe in detail representative products and methods of making them in accordance with this invention. The examples have been selected for purposes of illustration and are not presented to suggest limitations not previously described and not included in the appended claims.

In the accompanying drawings, Figure 1 is a diagrammatic elevation in cross-section of an electrodialytic cell containing a membrane produced in accordance with the invention.

EXAMPLE 1

Anisole sulfonic acid was prepared by adding 60 cc. of sulfuric acid (96.5 per cent, 1.2 mols) to 108 cc. of anisole (1.0 mols) and warming the mixture to about 100° C. The mixture was then allowed to cool to about 40° C. over the course of fifteen minutes after which 40 cc. of water were added. The homogeneous solution was cooled to 20° C. and 115 cc. of 36 per cent formaldehyde (1.5 mols) were added. The solution was cast on reinforcing material of "Saran" screen which is a polymerized vinylidene chloride plastic composition, glass paper, glass cloth, battery paper and a paper of polystyrene-coated glass fibers sandwiched between two glass plates spaced about 1 mm. apart. The casts were baked 21 hours at 85° C. During polymerization, evaporation of the solvent (water) into the space between the plates beyond the area occupied by the cast occurred only at the edges of the cast. The dried edges sealed the interior of the cast from additional evaporation. After polymerization was complete, the dried edges were trimmed off and discarded. The resulting membrane was 0.8 mm. thick. It was converted to the sodium form by equilibrating with 1 N sodium chloride solution and then thoroughly leached with distilled water. The properties of the structures are listed in Table I.

EXAMPLE 2

Phenolsulfonic acid was prepared by reacting 94 grams (1 mol) of molten phenol with 60 cc. of 96.5 per cent sulfuric acid at about 80° C. The mixture was allowed to cool to 40° C., over the course of about fifteen minutes after which time, 10 cc. of water was added. The resulting mixture was cooled to room temperature. Anisole sulfonic acid was prepared by reacting 108 cc. of anisole (1 mol) with 60 cc. of 96.5 per cent sulfuric acid and warming to about 100° C. The mixture was cooled to 40° C. at which time 40 cc. of water were added. The resulting mixture was then cooled to room temperature.

The two sulfonic acid solutions were mixed and 230 cc. of 37 per cent formaldehyde (3 mols) were added. The mixture was cast on reinforcing materials of "Saran" screen, glass paper, glass cloth, battery paper and a paper of polystyrene-coated glass fibers sandwiched between two glass plates spaced about 1 mm. apart. The casts were baked 21 hours at 85° C. under non-evaporative conditions which were obtained as explained in Example 1. The resulting membrane was 0.8 mm. thick. It was converted to the sodium form by equilibrating with 1 N sodium chloride solution and then thoroughly leached with distilled water. The properties of the structures are listed in Table I. In comparison with structures prepared from phenol sulfonic acid according to the method of the above mentioned application of Juda and McRae, the structures prepared in accordance with this example have improved resistance to swelling and decrepitation in dilute alkaline solutions and may be used in solutions having a pH of 10 or greater.

EXAMPLE 3

Phenetole sulfonic acid was prepared by adding 60 cc. of sulfuric acid (96.5 per cent) to 125 cc. of phenetole and warming the mixture to about 100° C. The mixture was then allowed to cool to about 40° C. over the course of fifteen minutes after which 55 cc. of isopropanol were added. The homogeneous solution was cooled to 20° C. and a solution of 45 grams of metaformaldehyde in 100 cc. of isopropanol were added. The solution was cast on reinforcing material of "Saran" screen, glass paper, glass cloth, battery paper, and a paper of polystyrene-coated glass fibers and sandwiched between two glass plates spaced about 1 mm. apart. The casts were heated for twenty hours at 85° C. under non-evaporative conditions obtained as set forth in Example 1. The resulting membranes were leached in distilled water and then converted to the sodium form by equilibrating with 1 N sodium chloride solution and were then thoroughly leached with distilled water. The properties of the membranes are listed in Table I.

EXAMPLE 4

The sulfonic acid of resorcinol dimethyl ether was prepared by adding 60 cc. of sulfuric acid (96.5 per cent) to 130 cc. of resorcinol dimethyl ether and warming the mixture to about 100° C. The mixture was then allowed to cool to about 40° C. over the course of about twenty minutes after which 50 cc. of dioxane were added. The homogenous solution was cooled to 20° C. and a solution of 45 grams of metaformaldehyde in 110 cc. of dioxane were added. The solution was cast on reinforcing material of "Saran" screen, glass paper, glass cloth, battery paper, and a paper of polystyrene-coated glass fibers and sandwiched between two glass plates spaced about 1 mm. apart. The casts were heated for twenty hours at 85° C. under non-evaporative conditions obtained as set forth in Example 1. The resulting membranes were leached in distilled water and then converted to the sodium form by equilibrating with 1 N sodium chloride solution and were then thoroughly leached with distilled water. The properties of the membranes are listed in Table I.

The reinforcing materials used in the above examples give increased mechanical resistance to fracture and propagation of fractures. They may, however, be omitted, if desired. The "Saran" screen was woven at seventeen threads per linear inch and weighed 200 grams per square yard. The glass paper is described in "The Electrical Properties of Glass Fiber Paper" by T. D. Callanan, R. T. Lucas and R. C. Bowers, May 1951, Naval Research Laboratory. It had a thickness of 0.4 mm. and a density of 0.21 gram per cubic centimeter. The battery paper is an impregnated paper impervious to acids and is commonly used as a separator of the lead plates in storage batteries and may be described as a phenolic-coated, fiber-coated, lofty, cellulose fiber paper. It had a thickness of 0.45 mm. and a weight of 1.5 grams per square decimeter. The paper of polystyrene-coated, glass fibers had a thickness of 0.5 mm. and a weight of 47.6 grams per square meter.

*Table*

| Example | Type | Moisture, percent | Cap., meq./g. | Conc., E. M. F. | Cond., ohm$^{-1}$ cm.$^{-1}$×10$^3$ |
|---|---|---|---|---|---|
| 1 | Anisole | 55 | 1.0 | 15 | 1 |
| 2 | Anisole-Phenol | 55 | 2.3 | 13 | 11 |
| 3 | Phenetole | 50 | 1.2 | 14 | 3 |
| 4 | Resorcinol-Dimethyl Ether | 55 | 1.3 | 14 | 4 |

The physical characteristics of the membrane produced in the above examples are set forth in the table. The moisture content was obtained by drying a specimen as prepared in the examples to constant weight at 105° C. and expressing the loss of weight as per cent of the aqueous material after correction has been made for reinforcing material, if any. The ion exchange capacity was determined by bringing a specimen into equilibrium with 4 N hydrochloric acid solution, then leaching repeatedly in distilled water to remove adsorbed hydrochloric acid and finally removing all hydrogen by soaking repeatedly in 4 N sodium chloride solution until equilibrium was reached and titrating that solution for hydrogen. The capacity is expressed as the number of milliequivalents of hydrogen removed by the sodium chloride per gram of 105° C. dried material in the sodium form.

The concentration potential was measured in a concentration cell separating 0.60 N and 0.30 N sodium chloride solutions, between calomel electrodes connected with the sodium chloride solutions through saturated potassium chloride salt bridges. The membrane was equilibrated in a 4 N sodium chloride solution, leached in distilled water, and equilibrated in a 0.60 N sodium chloride solution prior to insertion in the cell. The respective solutions in the cell were continuously renewed to maintain the concentrations. The values recorded in the table are the open circuit potentials after steady conditions were attained. In such a cell the thermodynamically ideal concentration potential is 17 millivolts. It will be seen from the table that this standard was consistently approached.

The electrical conductivity was measured by forming from a leached membrane as prepared in the examples a strip 10 cm. long and 1 cm. wide, clamping the ends to copper electrodes and measuring the resistance to 60 cycle alternating current. The conductivity is the reciprocal of the resistivity.

In the foregoing examples, anisole, phenetole, and resorcinol dimethyl ether were selected as the preferred and representative alkyl-aryl ethers but it will be understood that these examples may be multiplied to great length by substituting those representative alkyl-aryl ethers described above or similar alkyl aryl ethers capable of forming methylol forming sulfonic acids, for the alkyl aryl ethers of the examples. Similarly formaldehyde has been selected but it may be replaced by other aldehydes such as furfural, acetaldehyde, benzaldehyde, and the like capable of condensing with anisole and other alkyl aryl ethers. Broadly, this invention and a general description of the methods of practicing it are set forth in the paragraphs immediately preceding the specific examples.

In the examples the polymerizations were carried out between two glass plates approximately 20 cm. by 20 cm. spaced about 1 mm. apart. It has been found that under the conditions of the examples substantially no evaporation takes place through the restricted aperture between the plates so that only the outermost edges of the polymerized structures lose solvent during the course of polymerization. The partially dried edges appear to prevent further evaporation of solvent. After polymerization is complete, the edges are trimmed off. In some cases, for example, at elevated temperatures or long-continued curing, it may be necessary to use sealed molds to prevent evaporation.

The following example illustrates the practical application of the structures of this invention in the treatment of liquids containing dissolved, ionized substances.

EXAMPLE 5

The structures of the above examples may be tested for their water-treating properties in a simple cell shown schematically in the figure. Solutions 0.03 N in sodium chloride (a concentration of dissolved substances often found in naturally occurring brackish waters) are held in a container 1 separated into anode and cathode chambers 5 and 6 respectively by electrolytically conductive structures or barriers prepared in accordance with the above examples. Graphite electrodes 3 and 4 are present in the chambers 5 and 6 and contact the sodium chloride solution contained within the chambers. Electrically conductive leads 7 and 8 connect the electrodes with a source of voltage, e. g. a D. C. battery 9 of such polarity that the electrode 3 is anodic. When an electric current is imposed, chlorine is evolved at electrode 3 and hydrogen at electrode 4. It is found that the current is carried across the structure 2 almost completely by sodium ions passing out of chamber 5 into chamber 6 thereby reducing the sodium ion content.

From the foregoing it will be appreciated that this invention provides not only a novel solid gel structure and a method of preparing it, but also a novel use thereof in the field of electrodialysis.

Having thus disclosed my invention: I claim as new and desire to secure by Letters Patent:

1. The method of forming a solid cation-permeable unfractured structure of sulfonated alkyl aryl ether-aldehyde condensation products, said structure having at least two dimensions each in excess of 0.25 inch comprising reacting a methylol-forming sulfonated alkyl aryl ether and an aldehyde and at least 20% solvent therefor, based on the weight of condensed solid material including solvent, to the insoluble infusible stage of condensation and under conditions substantially preventive of escape of said solvent.

2. The method defined by claim 1 wherein the solvent is water.

3. The method of forming a solid cation-permeable unfractured structure of sulfonated alkyl aryl ether-aldehyde condensation products comprising heating a solution containing a methylol-forming sulfonated alkyl aryl ether and an aldehyde and at least 20 per cent solvent based on the weight of condensed solid material including solvent, under conditions substantially preventive of the escape of solvent, to effect the condensation of the ether and aldehyde to the insoluble infusible stage.

4. The method defined by claim 3 wherein the methylol-forming sulfonated alkyl aryl ether and aldehyde are present in the molar ratio of 1.3–2.0 mols aldehyde per mol of ether.

5. The method of forming a solid cation-permeable unfractured structure of sulfonated alkyl aryl ether-aldehyde condensation products, said structure having at least two dimensions each in excess of 0.25 inch, comprising combining a methylol-forming sulfonated alkyl aryl ether and an aldehyde in aqueous solution, casting the same to a predetermined form and heating said combination while so cast under conditions substantially preventive of the evaporation of water to effect the condensation thereof to the insoluble, infusible stage, there being present throughout said condensation at least 20 per cent of water based on the weight of condensed solid material including water.

6. The method defined by claim 5 wherein the alkyl aryl ether is anisole.

7. As an article of manufacture, a solid unfractured structure having at least two dimensions each in excess of 0.25 inch and comprising an insoluble, infusible condensation polymer of a methylol-forming sulfonated alkyl aryl ether and an aldehyde, in gel relationship with at least 20 per cent solvent based on the weight of condensed solid material including solvent, said solvent presenting a continuous phase throughout said gel, said product being chemically and physically stable in strongly alkaline solutions.

8. The article defined by claim 7 wherein the solvent is water.

9. As an article of manufacture, a solid unfractured structure having at least two dimensions each in excess of 0.25 inch and having electrical conductivity in excess of $5 \times 10^{-3}$ ohm$^{-1}$ cm.$^{-1}$ and substantial cation-permselectivity comprising a water-insoluble, infusible condensation polymer of a methylol-forming sulfonated alkyl aryl ether and an aldehyde combined in the molar ratios of 1.3 to 2.0 mols of aldehyde per mol of alkyl aryl ether, said polymer being in gel relationship with at least 20 per cent water based on the weight of condensed solid material including water, and said water presenting a continuous phase throughout said gel.

10. The method of treating solutions of electrolytes to remove cations therefrom which comprises contacting said solutions with a barrier comprising a solid unfractured structure of a water insoluble condensation polymer of a methylol-forming sulfonated alkyl aryl ether and an aldehyde, in gel relationship with at least 20 per cent by weight of a solvent, the latter presenting a continuous phase throughout said gel, and passing a direct electric current through said solutions and barrier to effect the migration of the cations from said solutions into said barrier.

11. The method of treating a solution of an electrolyte to remove cations therefrom without the substantial transfer of anions thereto, comprising separating said solution from a second electrolytic solution by means of a cation-permselective barrier comprising a water-insoluble, infusible unfractured structure of a polymer of a methylol-forming sulfonated alkyl aryl ether and an aldehyde, in gel relationship with at least 20 per cent by weight solvent, said solvent presenting a continuous phase throughout said gel, and passing a direct electric current through said solutions and barrier in the direction to cause the migration of cations from the first solution to the second solution.

12. The method of treating a solution of an electrolyte to remove cations therefrom which comprises contacting said solution with a cation-permselective, solid barrier having electrical conductivity in excess of $5 \times 10^{-3}$ ohm$^{-1}$ cm.$^{-1}$ and comprising a water-insoluble, unfractured structure of an infusible condensation polymer of at least one methylol-forming sulfonated alkyl aryl ether and an aldehyde combined in the molar ratio of 1.3 to 2.0 mols of aldehyde per mol of alkyl aryl ether, said polymer being in gel relationship with at least 20 per cent by weight of water, and said water presenting a continuous phase throughout said gel, and passing an electric current through said solution and said barrier to effect the migration of the cations from said solution into said barrier.

References Cited in the file of this patent

UNITED STATES PATENTS

| | | |
|---|---|---|
| 2,259,503 | Wassenegger | Oct. 21, 1941 |
| 2,636,851 | Juda et al. | Apr. 28, 1953 |
| 2,692,866 | Haagen | Oct. 26, 1954 |

FOREIGN PATENTS

| | | |
|---|---|---|
| 829,498 | Germany | Jan. 28, 1952 |

OTHER REFERENCES

"Helvetica Chimica Acta," vol. 23 (1940), pp. 795–800, article by Meyer et al.